(12) United States Patent
Love

(10) Patent No.: US 7,133,280 B2
(45) Date of Patent: Nov. 7, 2006

(54) MULTIAXIAL HINGE ASSEMBLY WITH ROTATIONAL DIRECTION INDICATOR

(75) Inventor: John S. Love, Sioux City, IA (US)

(73) Assignee: Gateway Inc., Irvine, CA (US)

( * ) Notice: Subject to any disclaimer, the term of this patent is extended or adjusted under 35 U.S.C. 154(b) by 120 days.

(21) Appl. No.: 10/805,732

(22) Filed: Mar. 22, 2004

(65) Prior Publication Data

US 2005/0207104 A1   Sep. 22, 2005

(51) Int. Cl.
H05K 5/00 (2006.01)
H05K 7/00 (2006.01)

(52) U.S. Cl. .................................................. 361/681

(58) Field of Classification Search ................ 361/681, 361/682, 683; 345/169, 184, 905; 248/900, 248/917; 16/367; 379/433.13; 455/575.3
See application file for complete search history.

(56) References Cited

U.S. PATENT DOCUMENTS

| | | | |
|---|---|---|---|
| 4,344,686 A | 8/1982 | Stemme et al. | |
| 5,278,600 A | 1/1994 | Takahashi et al. | |
| 6,224,272 B1 | 5/2001 | Myers | |
| 6,275,376 B1 * | 8/2001 | Moon | 361/683 |
| D447,814 S | 9/2001 | Swagel et al. | |
| 6,536,371 B1 * | 3/2003 | Brazell | 116/309 |
| 6,587,333 B1 * | 7/2003 | Tseng et al. | 361/681 |
| 6,694,570 B1 * | 2/2004 | Chen | 16/367 |
| 6,742,221 B1 * | 6/2004 | Lu et al. | 16/367 |
| 6,804,861 B1 * | 10/2004 | Hsu | 16/366 |
| 6,850,407 B1 * | 2/2005 | Tanimoto et al. | 361/681 |
| 6,912,122 B1 * | 6/2005 | Chen et al. | 361/681 |
| 6,922,212 B1 * | 7/2005 | Nakakubo et al. | 348/373 |
| 2002/0048459 A1 * | 4/2002 | Mishio | 396/429 |
| 2003/0052857 A1 * | 3/2003 | Pappas | 345/156 |
| 2003/0132065 A1 | 7/2003 | Suzuki | |
| 2003/0193773 A1 * | 10/2003 | Choi | 361/683 |
| 2004/0061999 A1 * | 4/2004 | Takemoto et al. | 361/683 |
| 2004/0203532 A1 * | 10/2004 | Mizuta | 455/90.3 |
| 2005/0079897 A1 * | 4/2005 | Nishijima et al. | 455/575.1 |

FOREIGN PATENT DOCUMENTS

EP   1 281 474 A1   2/2003

* cited by examiner

Primary Examiner—Lynn Feild
Assistant Examiner—Ingrid Wright
(74) Attorney, Agent, or Firm—Jeffrey A. Proehl; Woods Fuller Schultz & Smith

(57) ABSTRACT

A multiaxial hinge assembly that enables rotation about a first axis between a clockwise limit and a counterclockwise limit and also enables rotation about a second axis that is orthogonal to the first includes a rotational direction indicator to provide an indication of a direction of rotation about the first axis to reduce the likelihood of rotation against the clockwise or counterclockwise limits and possible damage to the hinge assembly, or connected apparatus, or both. In one example, the multiaxial hinge assembly may be used for mounting the display of a hybrid notebook/tablet PC to provide an indication to a user of the direction in which the display may be counter-rotated when the hinge is positioned at either the clockwise or counterclockwise limits.

13 Claims, 4 Drawing Sheets

MULTIAXIAL HINGE ASSEMBLY WITH ROTATIONAL DIRECTION INDICATOR

TECHNICAL FIELD

The present invention relates in general to multiaxial hinge assemblies, and more particularly to a multiaxial hinge assembly rotatable about a first (vertical) axis between clockwise and counterclockwise limits and about a second (horizontal) axis orthogonal to the first and that includes a direction indicator for proper rotation about the first axis.

BACKGROUND

A notebook PC generally includes a main body portion that houses a processor, motherboard, associated peripheral components, rechargeable batteries, disk drives, cursor controls and a keyboard, and a display portion that is pivotably joined to the main body. The display of a notebook PC typically is joined to the main body by a pair of spaced, single-axis hinges positioned on a common horizontal axis at or near a back edge of the main body. The hinges enable the display to pivot in clamshell fashion from a closed position in which the display is folded face down over the keyboard and secured in place, through a range of working positions in which the display faces the keyboard, to a fully open position in which the display can lie in a face up, 180 degree position next to the main body, or, in some examples, can be pivoted beyond 180 degrees to a position behind the main body.

A tablet PC is modeled after an ordinary pen and pad of paper and integrates a sensor array, which generates signals according to where it has been touched, such as by a specialized digital stylus, together with a flat panel display to form a digital writing tablet. The display screen/writing tablet essentially covers the entire top surface of the main body of the tablet PC where traditional keyboard and cursor controls are located on a notebook PC. With a suitable handwriting recognition software platform, users can interact with the tablet PC and input a wide variety of data including text and graphics, simply by writing on the display surface with the digital stylus or pen. Although the tablet PC represents a significant advance, many users find that a keyboard is still necessary for some applications. Thus, a hybrid or convertible notebook/tablet PC has been developed that enables a tablet PC to be converted back and forth between a notebook mode in which the display faces the keyboard and a tablet mode in which the display/writing slate overlies the keyboard.

A variety of hybrid notebook/tablet PCs mount the display to the main body on joint or hinge assemblies that enable the display to be maneuvered from a notebook to a writing tablet mode without being detached or disconnected electrically. For example, the display of a notebook/tablet hybrid PC can be mounted to the main body on a single multiaxial hinge assembly positioned at or near the center of a back edge of the main body. Such a multiaxial hinge assembly enables the display to be pivoted open and closed about a pivot axis in a manner similar to the typical notebook PC described above, and also enables the display to be rotated about a second "center" or vertical axis that is orthogonal to the pivot axis. Rotation about the center or vertical axis allows the display to be oriented facing toward or away from the keyboard side of the PC at a variety of angles. When the display is rotated 180 degrees to face away from the keyboard, it can then be closed face up over the keyboard to provide a writing tablet. When the display is rotated back to face the keyboard the PC can be used as a notebook and the display can be closed face down to cover the keyboard and display for storage.

While a number of different hinge and joint assemblies can be employed to mount the display of a hybrid notebook/tablet PC, such as universal joints, saddle joints, ball and socket joints, and the like, essentially, any such hinge or joint assembly will have at least two orthogonal axes of rotation and provide sufficient rotational freedom thereabout to convert the hybrid tablet/notebook PC between notebook and tablet modes. Such a mechanism, referred to herein as a multiaxial hinge assembly, is a hinge or joint assembly that enables rotation about at least two orthogonal axes (i.e., axes that are mutually perpendicular).

Although a hybrid notebook/tablet PC with a multiaxial hinge that limits rotation about the center axis to 180 degrees can easily be converted between notebook and tablet modes, unfortunately, it is often difficult for users to remember which way the display must be rotated to change from one mode to another. The hinge mechanism does not provide any external indication of the correct direction of rotation and often provides inadequate sensory feedback when an incorrect rotation is attempted. For example, a hinge stop mechanism may prevent rotation of the hinge beyond its predetermined limits but the flexibility inherent in a portable PC display panel, which will act as a lever against the hinge, makes it difficult for users to sense that the hinge is at a rotational limit, particularly so if torque detents are also used to help hold the display in place at 0 and 180 degrees. Considerable torque can be applied to the hinge in the wrong direction before the user senses the hinge is against a stop, rather than a detent (soft) stop. Repeated attempts to rotate the hinge against the stop mechanism may cause the hinge or stop to loosen up, rendering it even more difficult to determine when the hinge is at the limit. Excessive play in the stop mechanism may also cause failure of the latch that secures the display to the main body and which depends on the hinge stop mechanism for proper alignment. Thus, there is a need for a hybrid notebook/tablet multiaxial hinge assembly that provides a reliable, easy to interpret indication to a user of the correct direction to rotate the display to reduce the likelihood of damage to the hinge assembly and/or display from attempts to rotate the hinge beyond a rotational limit.

SUMMARY

In general, in one aspect, a multiaxial hinge assembly that enables rotation about a first axis between a clockwise limit and a counterclockwise limit and rotation about a second axis that is orthogonal to the first, includes a surface that is rotatable about the first axis comprising a display window, and a display surface underlying the surface rotatable about the first axis, the display surface including a first directional indicator, such as an arrow, indicating a counterclockwise rotational direction and positioned to be revealed in the display window when the multiaxial hinge assembly is rotated substantially to the clockwise limit, and a second directional arrow indicating a clockwise rotational direction and positioned to be revealed in the display window when the multiaxial hinge assembly is rotated substantially to the counterclockwise limit.

In general, in another aspect, a method of providing an indication to a user of a direction of rotation about a first axis of a multiaxial hinge assembly that enables rotation about at least two orthogonal axes, wherein rotation about the first axis is constrained by counterclockwise and clockwise limits to avoid over-twisting of electrical cables carried within the multiaxial hinge assembly, includes providing a display window in a rotating surface of the hinge assembly, and providing a display surface underlying the rotating surface, the display surface including a first directional arrow pointing in a counterclockwise rotational direction and positioned to be revealed in the display window when the rotating surface is substantially rotated to the clockwise limit and a second directional arrow on the display surface pointing in a clockwise rotational direction and positioned to be revealed in the display window when the rotating surface is rotated substantially to the counterclockwise limit.

In general, in another aspect, a personal computer such as a hybrid notebook tablet PC, includes a display portion, a main body portion, and a multiaxial hinge assembly on which the display portion is mounted to the main body portion and which enables the display portion to be rotated relative to the main body portion about at least two orthogonal axes, and the multiaxial hinge assembly includes means to indicate a direction of rotation about a first axis when the display portion is rotated about the first axis substantially to one or more predetermined positions. In one aspect the means to indicate includes a directional arrow. In other aspects, the means to indicate may include and LED, an audible alert or a software routine to generate visual or audible indicators.

DETAILED DESCRIPTION

Figure 1:
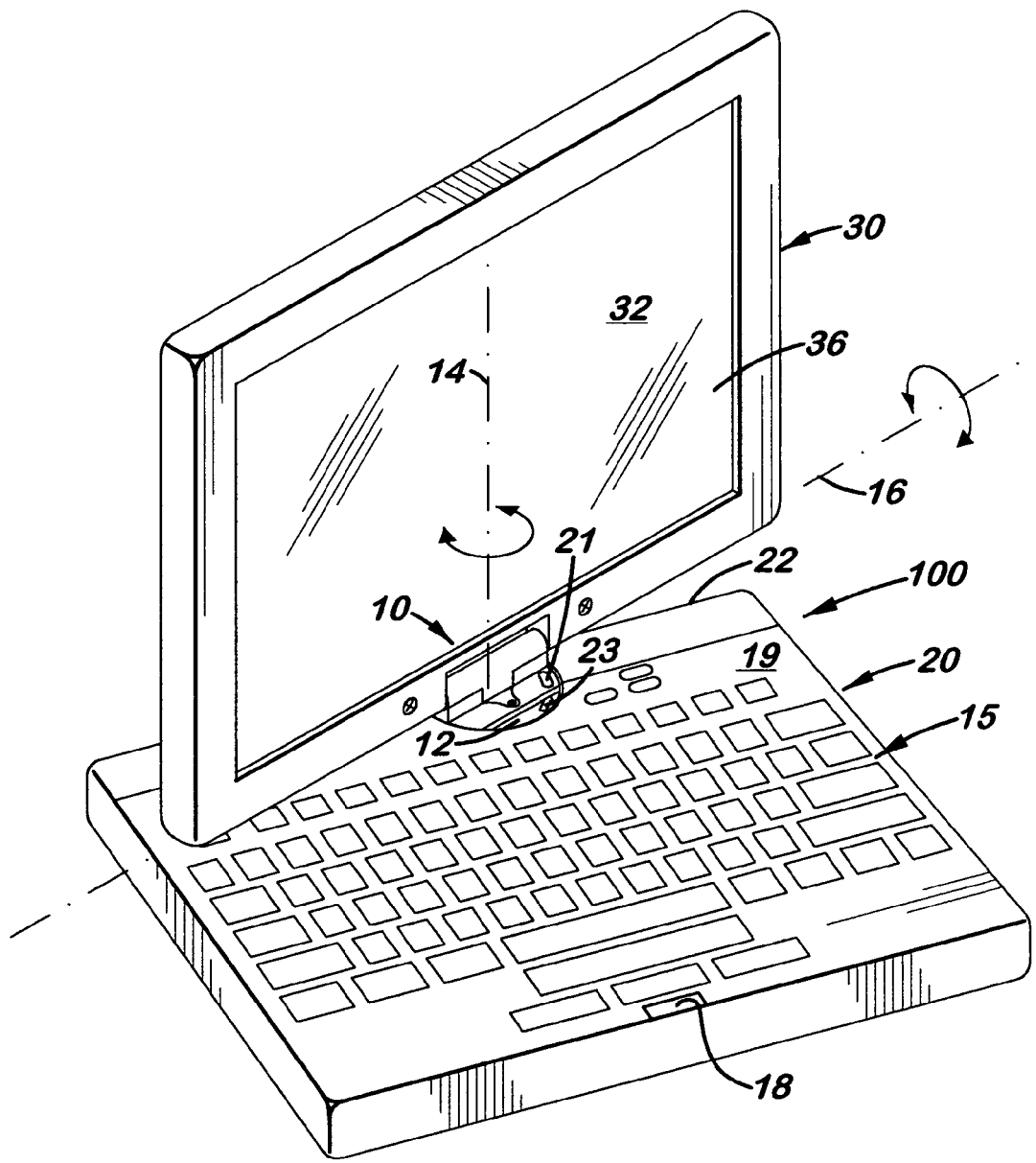
FIG. 1 is a perspective view of the preferred embodiment of a multiaxial hinge assembly according to the present invention on a hybrid notebook/tablet PC with the display in an upright, slightly rotated notebook mode position.

In the following detailed description, reference is made to the accompanying drawings that form a part hereof, and in which are shown by way of illustration specific embodiments in which the invention, as claimed, may be practiced. The invention may, however, be embodied in many different forms and should not be construed as limited to the embodiments set forth; rather, these embodiments are provided so that this disclosure will be thorough and complete, and will fully convey the scope of the invention to those skilled in the art. As will be appreciated by those of skill in the art, the present invention may be embodied in methods and devices. For example, in addition to a hybrid notebook tablet PC as disclosed herein, the present invention can be embodied in a personal digital assistant (PDA), a cellular telephone, a calculator, a DVD player, a digital camera or camcorder, a desktop computer with integrated flat screen display, a mounting device for a flat screen display, such as for use with a computer, multimedia device or television, or any other like device with an integrated display in a clamshell configuration or which is otherwise adjustable with respect to the main portion of the electronic device or with respect to another device on which it is mounted.

The present inventor recognized that one problem with notebook/tablet hybrid multiaxial hinge assemblies involves excessive twisting of flex cables that run between the display and main body. The flex cables are typically fed through the center of the hinge assembly and include numerous parallel power and signal connections. While various mechanical and electrical solutions have been devised to avoid excessive twisting of cables that pass through rotational assemblies, such as rotary contacts, and a variety of wireless, infrared and optical links, theses solutions add cost and complexity and provide the potential for additional modes of failure. Thus, the problem of excessive cable twisting in hybrid notebook/tablet PC multiaxial hinge assemblies is usually avoided by placing a limit on the rotation allowed about the center axis to about 180 degrees.

To facilitate understanding of the present invention, the preferred embodiment will be explained first from an external and operational viewpoint, followed by a detailed explanation of various internal features and components and alternative embodiments.

FIGS. 1–4 illustrate a preferred embodiment of a hybrid notebook tablet PC 100 according to the present invention that includes a main body portion 20 and a display portion 30 mounted to the back of the main body portion by a multiaxial hinge assembly 10. Main body portion 20 houses standard personal computer components such as a processor, motherboard, associated peripheral components, rechargeable batteries, disk drives, and the like, and provides a variety of user interfaces for entering data accessible on a top surface 19 including a keyboard 15 and associated cursor controls. Display portion 30 houses a flat panel display 36 visible from a front viewing side 32 and provides a back cover side 34 (not visible in the drawings) of a durable plastic, composite or metal material which protects the keyboard 15 and flat panel display 36 when hybrid PC 100 is not in use. In addition to providing a high resolution graphical display, flat panel display 36 incorporates circuitry for detecting and digitizing data written on the display by the user with a digitizing stylus or pen 7.

Hybrid PC 100 may be used either in a notebook mode in which flat panel display 36 functions primarily as a display device and data and commands are entered primarily via keyboard 15 and associated cursor controls, or in a tablet mode in which display 30 is folded over the keyboard 15 and data and commands are entered primarily by writing on the viewing side 32 of flat panel display 36. To convert the hybrid PC 100 from tablet to notebook mode, the display portion 30 is maneuvered on multiaxial hinge assembly 10 from a tablet position in which the display panel 36 overlies keyboard 15 with the viewing side 32 facing up as in FIG. 2, to a notebook position in which the display panel 36 is upright and facing the keyboard 15 at a comfortable viewing angle for a user entering data via the keyboard. FIG. 1 shows the hybrid PC 100 in notebook position with the display rotated on multiaxial hinge 10 slightly to one side.

Multiaxial hinge assembly 10 is positioned at the center of the main body housing 20 along a back edge 22 in a semicircular recess 12. It provides a limited range of rotation about two orthogonal axes, a pivot (horizontal) axis 16 which extends transversely along the bottom edge of display portion 30, and a center (vertical) axis 14 which is orthogonal to pivot axis 16. Multiaxial hinge assembly 10 permits pivoting of the display portion 30 in clamshell fashion about pivot axis 16 over a range of approximately 180 degrees. Display portion 30 thus can pivot from a closed position in which it is folded over the top surface 19 of main body housing 20 and covers keyboard 15, through a variety of upright positions for use in notebook mode, to an extreme open position, in which the display portion 30 lies adjacent to the main body portion 20 on approximately the same plane as top surface 19.

Figure 2:
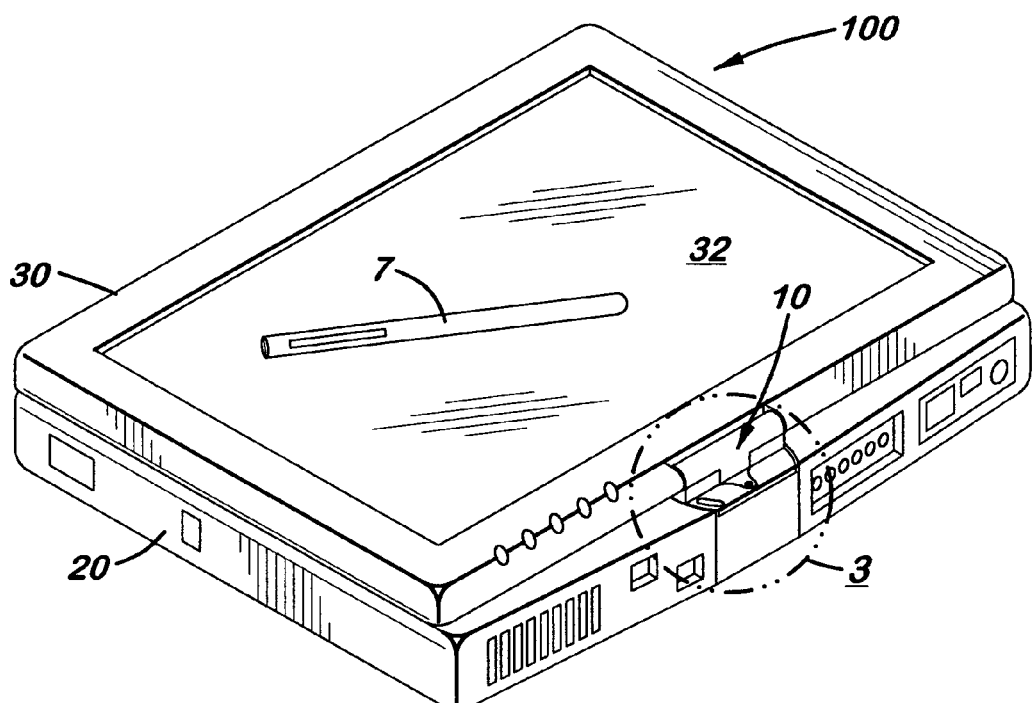
FIG. 2 is a perspective view of the preferred embodiment of a hinge assembly according to the present invention on a hybrid notebook/tablet PC with the display in a tablet mode position as seen from the back.
Figure 3:
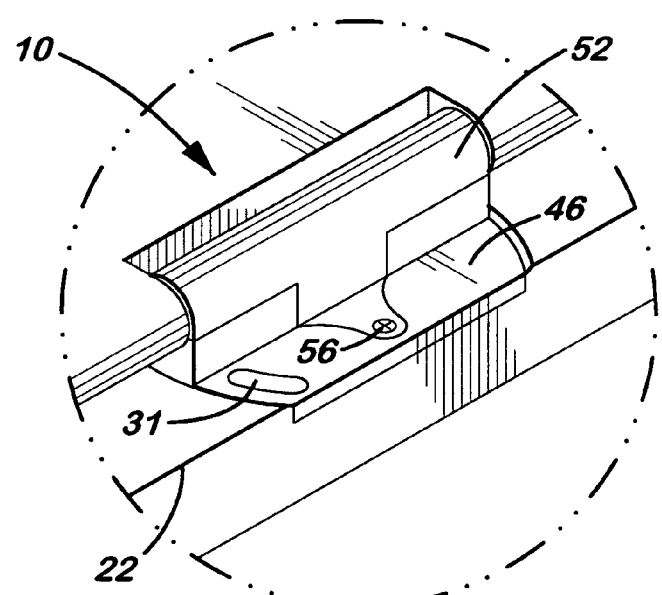
FIG. 3 is an enlarged view of the hinge portion of FIG. 2.

To avoid excessive twisting of electrical cables that feed through multiaxial hinge assembly 10 between the display and main body, rotation of display portion 30 about center axis 14 is limited to a range of approximately 180 degrees. This range of motion is adequate to enable the hybrid notebook/tablet PC to be converted between notebook and tablet modes. For example, when multiaxial hinge assembly 10 is rotated about center axis 14 to the clockwise rotational limit, display portion 30 will be aligned so that viewing side 32 faces keyboard 15. A counterclockwise rotation about center axis 14 to the counterclockwise rotational limit will align the display portion 30 so that viewing side 32 faces 180 degrees away from keyboard 15 and cover side 34 faces the keyboard. With the multiaxial hinge 10 oriented so that cover side 34 faces the keyboard, display portion 30 can be pivoted on axis 16 to fold face up over the keyboard 15 for use in tablet mode as shown in FIG. 2. When the multiaxial hinge 10 is at either rotational limit about center axis 14, display portion 30 can be closed to overlie the keyboard 15 and secured in place by a manually releasable clasp 18, whether the display is in the face up or face down position.

When display 30 is rotated about center axis 14 to the clockwise or counterclockwise rotational limit, multiaxial hinge 10 provides an indication to inform the user of the direction of rotation away from the rotational limit. In alternative embodiments, the indication may be visible or audible (such as an audible alarm), and may be provided in whole or in part by mechanical or electromechanical mechanisms, or may be generated in hardware, firmware, software, or combinations thereof. In the preferred embodiment, the indication includes a mechanically actuated display of directional arrows that are integrated with the multiaxial hinge assembly 10 and come into view as rotating components of hinge assembly 10 are rotated about axis 14 in relation to non-rotating components of hinge assembly 10.

Figure 4:
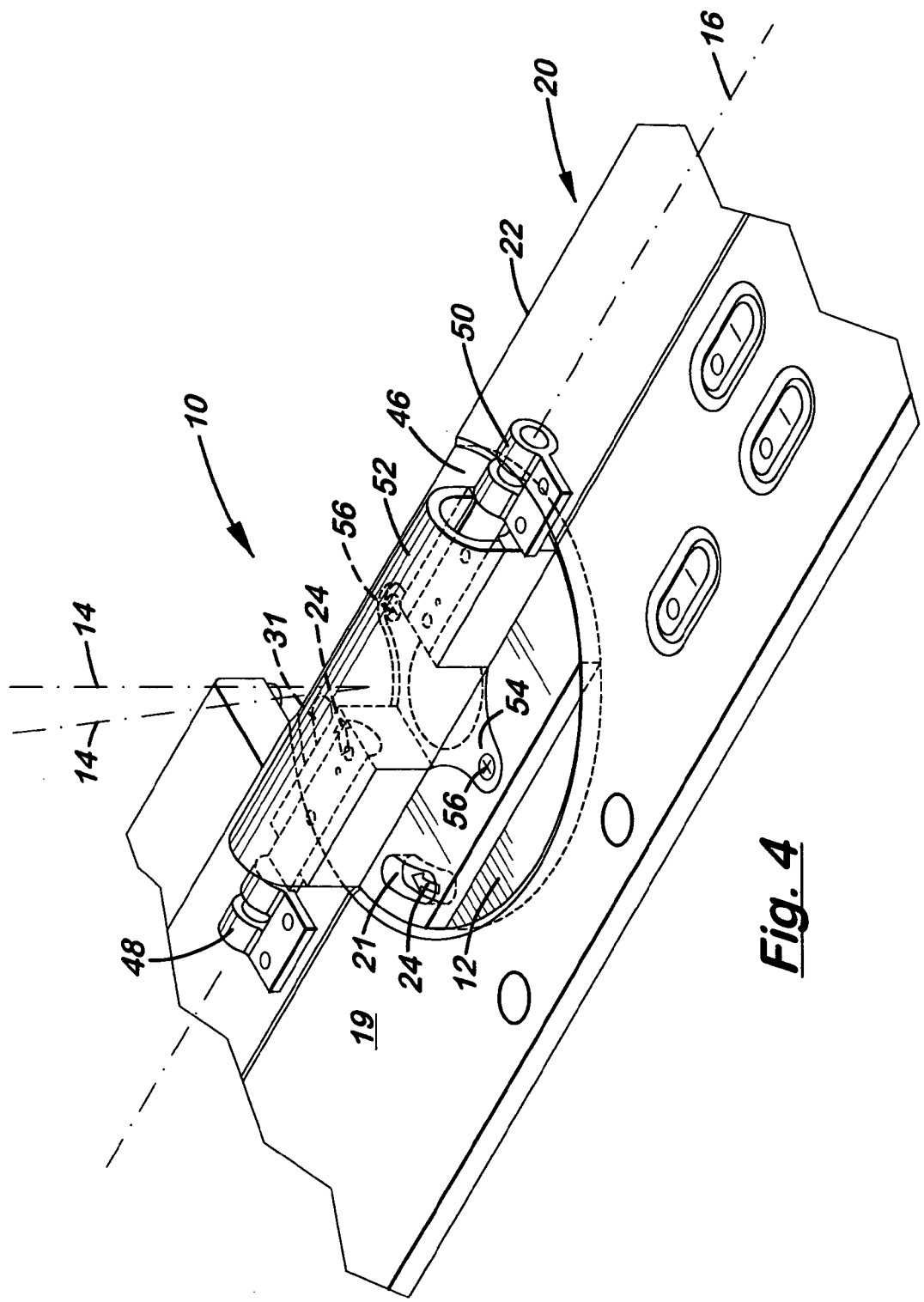
FIG. 4 is an enlarged partially broken away view of the preferred embodiment of a hinge assembly according to the present invention on a hybrid notebook/tablet PC as viewed from the front.

Referring to FIG. 4, multiaxial hinge 10 is shown at its counterclockwise rotational limit. In this position, a pair of display windows 21 and 31 in a pivot platform 46 have rotated with respect to the underlying and stationary display surface 49 to reveal the pair of clockwise directional arrows 24 on that surface. Similarly, when multiaxial hinge 10 is rotated to its clockwise rotational limit, display windows 21 and 31 have rotated on the hinge assembly with respect to the display surface 49 to display counterclockwise directional arrows 23 on display surface 49. Two pairs of windows and directional indicators are preferably provided on multiaxial hinge assembly 10 so that the directional indicators are visible and can be seen both in front of and behind display panel 30 (display panel 30 is not illustrated in FIG. 4).

Figure 5:
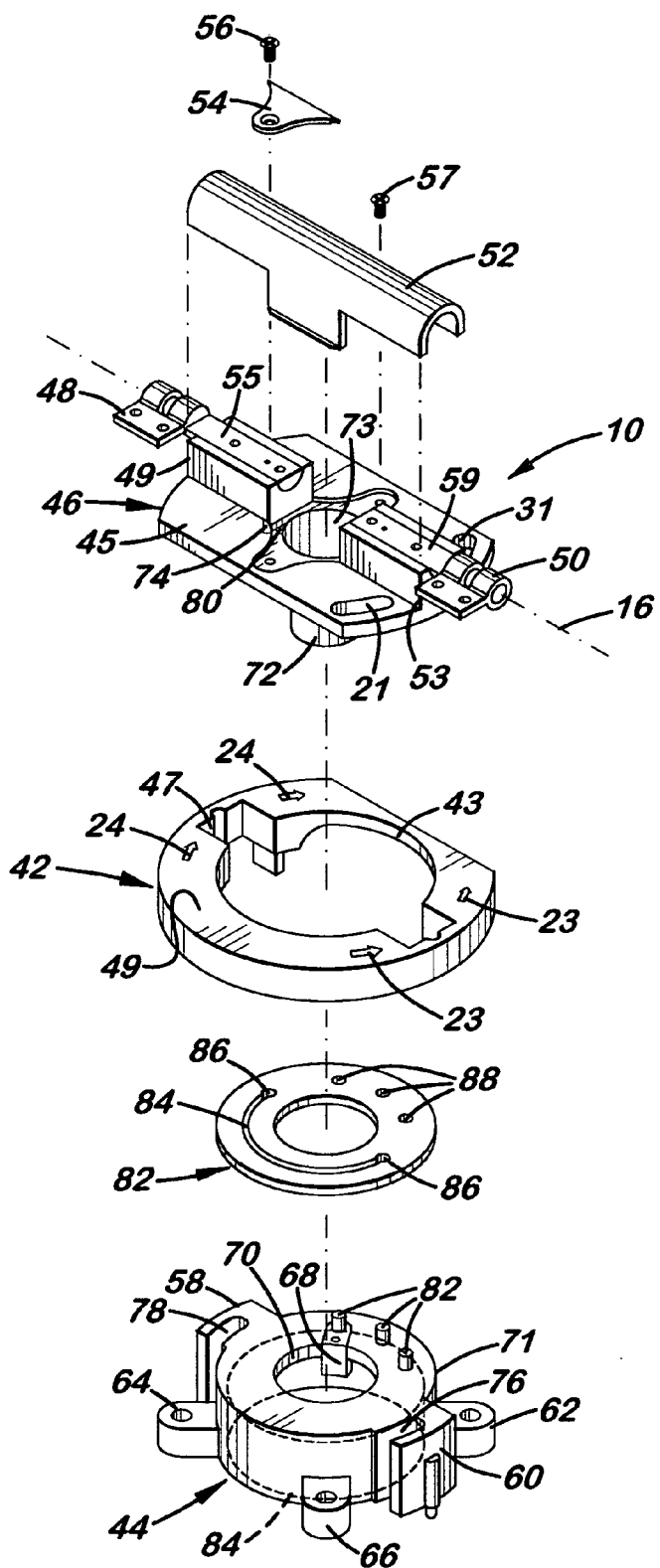
FIG. 5 is a partially exploded perspective view of the preferred embodiment of a hinge assembly according to the present invention for use with a hybrid notebook/tablet PC.

The details of a multiaxial hinge assembly 10 according to the preferred embodiment of the present invention will now be discussed. FIG. 5 shows an exploded perspective diagram of the preferred embodiment of a multiaxial hinge assembly 10 according to the present invention. The hinge assembly 10 includes a generally annular shaped stop assembly 44 centered on axis 14 and having a round inner aperture 70 and a generally cylindrical outer sidewall 71. A cylindrical inner sidewall 84, shown in phantom, defines a void within stop assembly 42. A generally flat top surface 41 extends perpendicularly from inner aperture 70 to outer sidewall 71. Three anti-rotation studs 82 project up from the top surface 41 of stop assembly 42 and are equidistant from the center axis 14. Stop assembly 44 is preferably cast from an aluminum alloy or similar metal or composite material that possesses good strength to weight characteristics. It is immovably secured to the main body 30 by machine screws (not shown) that engage threaded screw tabs 62, 64, 66, and 68 projecting radially from outer sidewall 71 near the bottom. Screw tabs 62 and 64 face generally toward the front of main body 30 and screw tabs 66 and 68 (68 shown in phantom) face generally toward the back. A pair of opposing hooks 58 and 60 project from outer sidewall 71 to the left and right of stop assembly 42 between front screw tabs 62, 64 and back screw tabs 66, 68 and bend forward (i.e., in opposite rotational directions) to define opposing stop pockets 76 and 78. Stop pockets 76 and 78 are separated rotationally by 180 degrees.

A cover plate 42 is shown directly above stop assembly 44 in FIG. 5. Cover plate 42 is immovably secured to stop assembly 44 and preferably is made from a cast or injection molded hard plastic material. It provides a substantially flat semicircular display surface 49 perpendicular to center axis 14 and through which there is a center opening 43 dimensioned to admit the stop assembly 44 so that surface 41 can be brought to a plane that is substantially flush with surface 49. Directional arrow pairs 23 and 24, which are preferably made from a metallic foil and colored to contrast with the top surface 49 for easy visibility, are embossed, painted or otherwise adhered to surface 49. Directional arrows 23 point in a counterclockwise direction and are positioned at approximately two o'clock and 4 o'clock positions about axis 14. Directional arrows 24 point in a clockwise direction and are positioned at approximately 8 o'clock and 10 o'clock positions about axis 14, as shown in the drawings.

A pivot platform 46 of a strong cast metal material is shown directly above cover plate 42. It provides a stable platform on which display portion 30 can be rotated about center axis 14. Pivot platform 46 includes an elongate plate-like platform section 45 perpendicular to center axis 14 and provides a cylindrical center hole channel 73 for passage of electrical cables between the display portion 30 and the main body 20. Pivot platform 46 further includes apertures through platform section 45 forming display windows 21 and 31 which are positioned radially from axis 14 and dimensioned to reveal directional arrows 23 and 24 on underlying stationary surface 49 as pivot platform 46 rotates about axis 14. Display windows 21 and 31 preferably are covered with a transparent plastic material to reduce the entry of dirt and dust into multiaxial hinge assembly 10.

A pair of opposing hinge pin brackets 49 and 53 are positioned on platform section 45 along pivot axis 16 on either side of center hole 73. Opposing hinge pins 55 and 59 are secured by machine screws in hinge pin brackets 49 and 53, respectively and define a pivot along a horizontal pivot axis 16. Display portion 30 is secured to multiaxial hinge assembly 10 by machine screws that engage brackets such as hinge plates 48 and 50 which are pivotably mounted to their respective hinge pins so as to enable display portion 30 to be pivoted about horizontal axis 16.

A hub 72 centered on axis 14 extends downwardly from the bottom of pivot platform 46 and is dimensioned to fit within the inner diameter 70 of stop assembly 44. A stop post 74 (shown in phantom underneath the left hinge pin mounting bracket 55) projects from the underside of pivot platform 46 at a distance from axis 14 to be engaged by stop pockets 78 and 76 to stop rotation of pivot assembly about axis 14 to prevent over-twisting of the flex cables within. Stop pocket 76 provides the counterclockwise stop limit and stop pocket 78 provides the clockwise stop limit for multiaxial hinge assembly 10.

A detent mechanism is also included in multiaxial hinge assembly 10 to provide some resistance against rotation when the hinge is positioned at the clockwise or counterclockwise limits. This detent mechanism makes it easier to position the display panel at 0 or 180 degrees, enabling positive alignment of the display latch mechanism to the body of the PC in either orientation. The detent mechanism includes a detent race ring 82 (shown exploded to the side in FIG. 5) that is mounted in sliding engagement on hub 72 between pivot platform 46 and stop assembly 44. Detent race ring 82 is secured against rotation about axis 14 by engaging three anti-rotation studs 82 projecting from surface 41 of stop assembly 44 in matching holes 88. A detent pin 80 (shown in phantom) projects down from the underside of pivot platform 46 between stop post 74 and hub 72 and is positioned to slide in a 180 degree circular race 84 formed in race ring 82 together with pivot platform 46. Detent pin 80 is able to slide unimpeded until the pivot platform 46 is rotated to the counterclockwise or clockwise limits. When either limit has been reached, pin 80 releasably snaps into a biased end pocket 86 located at either end of race 84 which provides resistance against inadvertent rotation away from the counterclockwise or clockwise limit positions.

A rounded top cover 52 of a precision cast polished metal is secured to pivot platform 46 by machine screws 56 and 57. Machine screw 56 engages a removable tab 54 that secures the front of top cover 52 to facilitate access to the hinge assembly and wiring within.

While the invention has been illustrated by an embodiment of a multiaxial hinge assembly that provides a rotationally stationary platform with directional indicators which are revealed in display windows of an overlying pivot assembly as the overlying pivot assembly is rotated, in alternative embodiments, directional indicators may be positioned on a rotating portion of a multiaxial hinge assembly so as to be revealed in one or more display windows of a stationary portion of the hinge assembly.

Various other alternative embodiments may provide a directional indication electronically by positioning one or more electronic actuators in or near a multiaxial hinge assembly. For example, a sensor or switch, responsive to optical, electrical or magnetic stimulus, may be positioned at one or more stationary rotational positions, such as stop pockets 76 and 78, and configured to provide a signal when a rotating element of the hinge assembly 10, such as stop post 74, which is provided with a corresponding optical, electrical or magnetic stimulus, is engaged by or swept past the position. Similarly, a sensor or switch, responsive to optical, electrical or magnetic stimulus, may be positioned on or near a rotating element of the hinge assembly 10, such as stop post 74, and configured to provide a signal when it is engaged by or swept past one or more a stationary positions that are provided with corresponding optical, electrical or magnetic stimulus. The signal may be used to actuate an indicator such as an LED or other display device, or to issue an audible alert, or to initiate a software routine that provides visual or audible indicators of one or more positions or rotational directions about center axis 14.

CONCLUSION

As has been shown, embodiments of the present invention provide a simple, easy to interpret, unambiguous indication of the correct direction of rotation for a multiaxial hinge assembly that is rotatable about a first axis between a clockwise limit and a counterclockwise limit and is also rotatable about a second axis that is orthogonal to the first. Embodiments of the present invention can be implemented in multiaxial hinge assemblies without significantly adding to the cost or complexity of the hinge design. Embodiments of the present invention are especially useful in connection with multiaxial hinges that are used to mount the display/writing tablet of a hybrid notebook/tablet PC but will also find application in a variety of other systems and apparatus. For example, a multiaxial hinge assembly according to the present invention may be employed on a rotating mount, stand or pedestal for a flat screen computer monitor, or a flat panel multimedia or television display.

A number of embodiments of the invention defined by the following claims have been described. Nevertheless, it will be understood that various modifications to the described embodiments may be made without departing from the spirit and scope of the claimed invention. For example, as noted, in alternative embodiments, directional indicators may include LEDs, sound producing devices, software generated displays and sounds, and the like, and may be actuated by switches or contacts, or by a variety of magnetic, optical, or electronic sensors positioned in or near the hinge assembly. Accordingly, other embodiments are within the scope of the invention, which is limited only by the following claims.

What is claimed is:

1. A multiaxial hinge assembly that enables rotation about a first axis between a clockwise limit and a counterclockwise limit and rotation about a second axis that is orthogonal to the first, comprising;
    a surface rotatable about the first axis and comprising a display window; and a display surface underlying the surface rotatable about the first axis, the display surface comprising:
    a first directional indicator indicating a counterclockwise rotational direction and positioned to be revealed in the display window when the multiaxial hinge assembly is rotated substantially to the clockwise limit, and
    a second directional indicator indicating a clockwise rotational direction and positioned to be revealed in the display window when the multiaxial hinge assembly is rotated substantially to the counterclockwise limit.

2. The multiaxial hinge assembly of claim 1, wherein the directional indicators comprise arrows.

3. The multiaxial binge assembly of claim 1, wherein the surface rotatable about the first axis further comprises a second display window, and wherein the display surface underlying the surface rotatable about the first axis further comprises:
    a third directional arrow, the third directional arrow pointing in a counterclockwise rotational direction and positioned to be revealed in the second display window when the multiaxial binge assembly is rotated substantially to the clockwise limit; and
    a fourth directional arrow, the fourth directional arrow on the display surface pointing in a clockwise rotational direction and positioned to be revealed in the second display window when the multiaxial hinge assembly is rotated substantially to the counterclockwise limit.

4. A multiaxial hinge assembly, comprising:
a pivot platform rotatable about a first axis between a clockwise limit and a counterclockwise limit;
a pivot mounted to the pivot platform that defines a second axis of rotation orthogonal to the first axis;
a display surface substantially centered on and normal to the first axis, comprising a first rotational directional indicator positioned along a first radius of the first axis at a first radial distance, and a second rotational directional indicator positioned along a second radius of the first axis at substantially the same distance as the first radial distance; and
a first display window overlying the display surface dimensioned and adapted selectively display the first and second directional indicators therethrough;
wherein a rotation of the pivot platform to the clockwise limit enables the first directional indicator to be displayed in the first display window and a rotation of the pivot platform to the counterclockwise clockwise limit enables the second directional indicator to be displayed in the first display window.

5. The multiaxial hinge assembly of claim 4, wherein the display surface is rotationally fixed in position with respect to the first axis and the first display window is rotatable about the first axis together with the pivot platform.

6. The multiaxial hinge assembly of claim 4 wherein the display surface further comprises a third directional indicator along a third radius of the first axis at a second radial distance and a fourth directional indicator of the first axis at substantially the same second radial distance, and wherein the multiaxial hinge assembly further comprises a second display window overlying the display surface dimensioned and adapted to display the third directional indicator at substantially the same time as the first directional indicator is displayed in the first display window and to display the fourth directional indicator at substantially the same line as the second directional indicator is displayed in the first display window.

7. The multiaxial hinge assembly of claim 6 wherein the first and second display windows are positioned on opposite sides the second axis.

8. The multiaxial hinge assembly of claim 4 wherein the clockwise and counterclockwise limits are adapted lo prevent rotation of the pivot platform about the first axis beyond approximately 180 degrees.

9. A multiaxial hinge assembly comprising:
a pivot platform rotatable about a first axis and comprising an center aperture that is substantially coaxial with the first axis;
a pivot mounted to the pivot platform which defines a second axis of rotation orthogonal to the first axis, the pivot comprising two opposing hinge pins extending radially outwardly from the center aperture;
a plurality of opposing hinge plates rotatably secured to the hinge pins,
a display window positioned in the pivot platform a predetermined radial distance from the first axis;
a stop post projecting downwardly from the pivot platform;
a surface underlying the pivot platform that is rotationally stationary with respect to the first axis and substantially centered thereon, comprising a clockwise directional arrow, a counterclockwise directional arrow and a center aperture that is substantially coaxial with the list axis; and
a stop assembly positioned beneath the pivot platform that is rotationally stationary with respect to the first axis and substantially centered thereon, the stop assembly comprising a counterclockwise stop pocket and a clockwise stop pocket adapted to engage the stop post when the pivot platform is rotated about the first axis to predetermined clockwise and counterclockwise limits and comprising a center that is substantially coaxial with the first axis;
wherein a rotation of the pivot platform to the clockwise limit causes the first directional indicator to be displayed in the first display window and a rotation of the pivot platform to the counterclockwise clockwise limit causes the second directional indicator to be to be displayed in the first display window to display a direction of rotation to a user in order to avoid an incorrect rotation of the multiaxial hinge assembly and over twisting of electrical cables passing through a channel in the multiaxial hinge assembly that is substantially coaxial with the first axis.

10. A method of providing an indication to a user of a direction of rotation about a first axis of a multiaxial hinge assembly that enables rotation about at least two orthogonal axes, wherein rotation about the first axis is constrained by counterclockwise and clockwise limits, the method comprising:
providing a display window in a rotating surface of the hinge assembly; and providing a display surface underlying the rotating surface, the display surface comprising a first directional arrow pointing in a counterclockwise rotational direction and positioned to be revealed in the display window when the rotating surface is substantially rotated to the clockwise limit and a second directional arrow pointing in a clockwise rotational direction and positioned to be revealed in the display window when the rotating surface is rotated substantially to the counterclockwise limit.

11. The method of claim 10, wherein the display surface is stationary with respect to the first axis of rotation.

12. A personal computer comprising:
a display portion;
a main body portion; and
a multiaxial hinge assembly on which the display portion is mounted to the main body portion and which enables the display portion to it rotated relative to the main body portion about at least two orthogonal axes, the multiaxial hinge assembly comprising;
means to indicate a direction of rotation about a first axis when the display portion is rotated about the first axis substantially to at least one predetermined position;
wherein the at least one predetermined position comprises a rotational limit;
wherein the means to indicate a direction of rotation comprises an arrow that is oriented to indicate a direction of rotation away from the rotational limit when the display is rotated about the first axis substantially to the at least one predetermined position;
wherein the arrow is revealed in a window positioned on a surface of the multiaxial hinge assembly when the display is rotated about the first axis substantially to the at least one predetermined position.

13. The personal computer of claim 12 wherein the surface on which the arrow is positioned is stationary with respect to rotation about the first axis.

* * * * *